United States Patent [19]

Kuranishi et al.

[11] Patent Number: 4,700,202

[45] Date of Patent: Oct. 13, 1987

[54] INK CARTRIDGE IN AN INK JET SYSTEM PRINTER

[75] Inventors: Masaaki Kuranishi, Yamatokoriyama; Masahiko Aiba, Nara, both of Japan

[73] Assignee: Sharp Kabushiki Kaisha, Osaka, Japan

[21] Appl. No.: 892,451

[22] Filed: Aug. 4, 1986

Related U.S. Application Data

[63] Continuation of Ser. No. 581,798, Feb. 21, 1984, abandoned.

[30] Foreign Application Priority Data

Feb. 23, 1983 [JP] Japan ............................ 58-26082[U]

[51] Int. Cl.[4] ............................................ G01D 15/16

[52] U.S. Cl. .................................. 346/140 R; 346/75; 141/329

[58] Field of Search .................. 346/140, 75; 141/329, 141/330; 604/415

[56] References Cited

U.S. PATENT DOCUMENTS

| | | | |
|---|---|---|---|
| 1,189,465 | 7/1916 | Mayo | 604/415 X |
| 2,186,888 | 1/1940 | Tullar | 604/415 X |
| 4,303,929 | 12/1981 | Blanck | 346/140 |
| 4,419,678 | 12/1983 | Kasugayama | 346/140 |
| 4,476,472 | 10/1984 | Aiba | 346/140 X |

*Primary Examiner*—Joseph W. Hartary

*Attorney, Agent, or Firm*—Birch, Stewart, Kolasch & Birch

[57] ABSTRACT

An ink liquid supply system for an ink jet system printer includes an ink intake needle formed in a body of the ink liquid supply system, and an ink cartridge removably mounted on the body of the ink liquid supply system. The ink cartridge includes an opening covered by a rubber seal through which the ink intake needle is inserted when the ink cartridge is mounted on the body of the ink liquid supply system. An ink liquid absorbing pad is attached to the rubber seal so as to cover the seal rubber. The ink liquid absorbing pad functions to prevent the ink liquid from dripping onto the body of the ink liquid supply system when the ink cartridge containing ink is denounted from the body of the ink liquid supply system.

3 Claims, 4 Drawing Figures

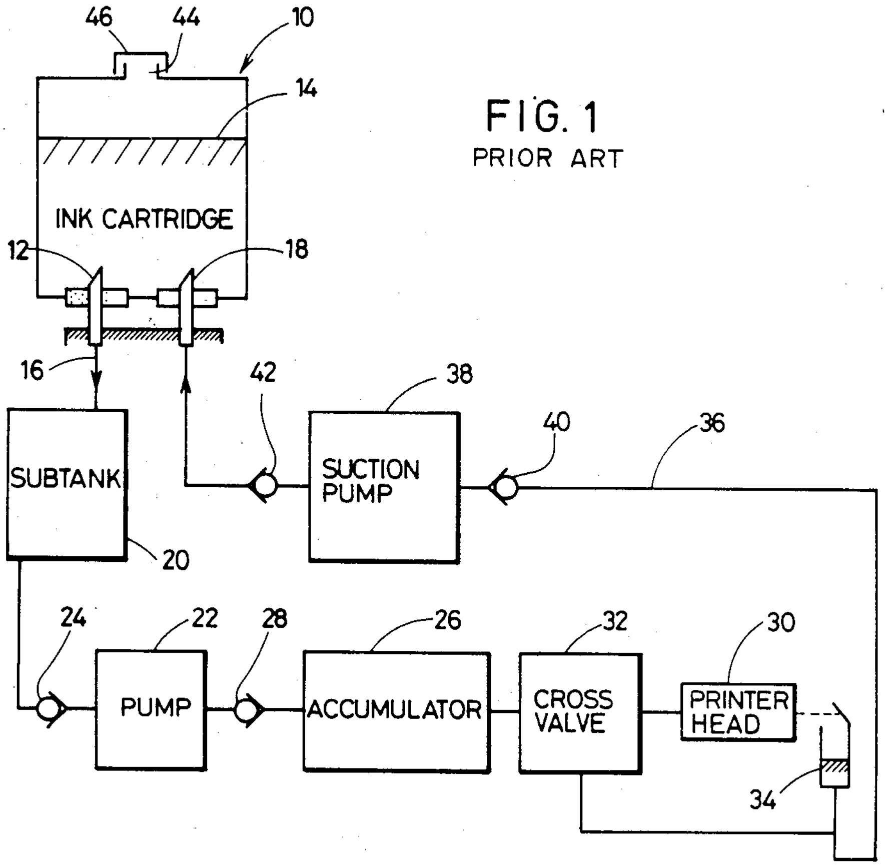
FIG. 1
PRIOR ART
FIG. 4
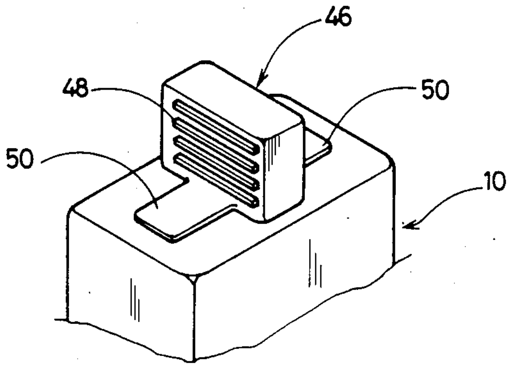

INK CARTRIDGE IN AN INK JET SYSTEM PRINTER

This application is a continuation of application Ser. No. 581,798 filed on Feb. 21, 1984, now abandoned.

BACKGROUND OF THE INVENTION

1. Field of the Invention

The present invention relates to an ink cartridge for use in an ink liquid supply system of an ink jet system printer.

2. Description of the Prior Art

Generally, an ink cartridge is employed in an ink liquid supply system for an ink jet system printer. The ink liquid supply system includes a standing needle which is inserted into a seal member formed in the ink cartridge when the ink cartridge is attached to the ink liquid supply system.

At a time when the ink cartridge is demounted from the ink liquid supply system while the ink liquid is still contained in the ink cartridge, there is a possibility that the ink liquid drops through the hole formed by the standing needle in the seal member. The ink liquid dropped from the ink cartridge may damage the insulation of the ink jet system printer. A preferred rubber seal to prevent the above-mentioned ink liquid dropping has not yet been found.

OBJECTS AND SUMMARY OF THE INVENTION

Accordingly, an object of the present invention is to provide an ink cartridge in an ink liquid supply system, which ensures a stable operation of an ink jet system printer.

Another object of the present invention is to provide an ink cartridge which does not drop ink liquid even though the ink cartridge is demounted from an ink liquid supply system under the condition where ink liquid is still contained in the ink cartridge.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an ink cartridge includes an opening into which a standing needle formed in an ink liquid supply system is inserted when the ink cartridge is secured to the ink liquid supply system. The opening is sealed by a rubber seal through which the standing needle is inserted. An ink liquid absorbing sheet is attached to the rubber seal at the outer surface thereof in order to absorb ink liquid which drips through a hole formed by the standing needle.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 is a block diagram of an ink liquid supply system in an ink jet system printer of the charge amplitude controlling type, which includes an embodiment of an ink cartridge of the present invention;

FIG. 4 is a perspective view of a cap portion included in the ink cartridge of FIG. 2.

DESCRIPTION OF THE PREFERRED EMBODIMENTS

Figure 2:
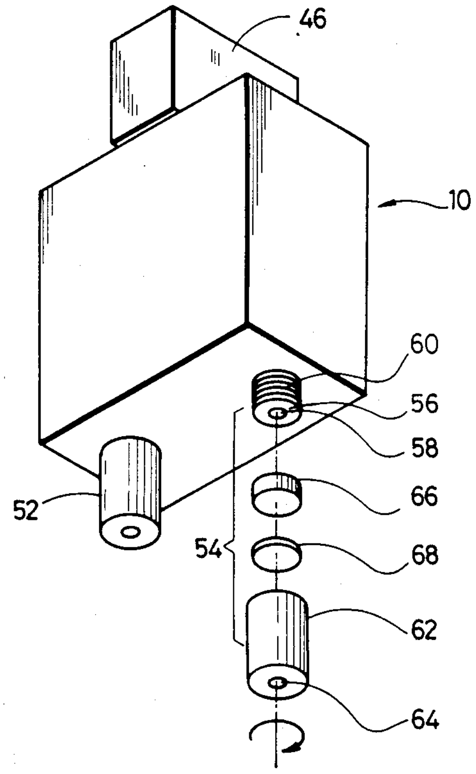
FIG. 2 is a perspective view of an embodiment of an ink cartridge of the present invention.
Figure 3:
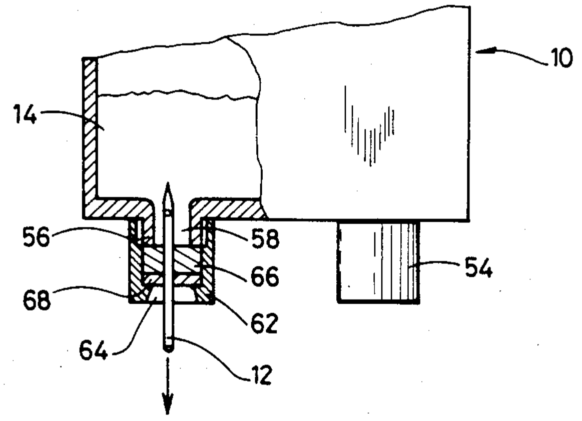
FIG. 3 is a partially sectional view of an essential part of the ink cartridge of FIG. 2, showing a condition where the ink cartridge is secured to the ink liquid supply system.

As seen in FIG. 1, an ink liquid supply system for an ink jet system printer of the charge amplitude controlling type includes an ink cartridge 10 removably secured to the ink liquid supply system. More specifically, the ink liquid supply system includes an ink intake needle 12 for introducing ink liquid 14 from the ink cartridge 10 into an ink supply conduit 16, and an ink discharge needle 18 for discharging the ink liquid toward the ink cartridge 10. The ink intake needle 12 and the ink discharge needle 18 are inserted into seal portions of the ink cartridge 10 when the ink cartridge 10 is secured to the ink liquid supply system.

An example of the ink liquid supply system of the abovementioned type is disclosed in copending application Ser. No. 512,639 now U.S. Pat. No. 4,476,472 "BUBBLE REMOVAL IN AN INK LIQUID SUPPLY SYSTEM OF AN INK JET SYSTEM PRINTER" filed on July 11, 1983 by Masahiko AIBA and Naohiro OKU, and assigned to the same assignee as the present application. The Japanese counterpart was filed on July 31, 1982 and assigned application number P 57-134010. The British counterpart is No. 8320190 filed on July 27, 1983. The German counterpart is No. P 33 26 717.0 filed on July 25, 1983. The Canadian counterpart was filed on July 13, 1983 and assigned Ser. No. 432,323.

The ink liquid introduced from the ink cartridge 10 is supplied to a subtank 20 via the ink supply conduit 16. A constant flow rate pump system 22 is connected to introduce the ink liquid from the subtank 20 via an ink inlet valve 24. The constant flow rate pump system 22 develops the ink liquid at a constant flow rate toward an accumulator 26 through an ink outlet valve 28. The accumulator 26 functions to stabilize the static pressure of the ink liquid developed from the constant flow rate pump system 22.

The thus stabilized ink liquid is supplied from the accumulator 26 to a printer head 30 via an electromagnetic cross valve 32. As is well known in the art, the printer head 30 includes a nozzle to which an electromechanical transducer (piezo vibrator) is attached in order to emit ink droplets at a given frequency. The printer head 30 further includes a charging tunnel for charging the ink droplets in accordance with a print information signal. The charged ink droplets are deflected while they pass between a pair of deflection electrodes which are also included in the printer head 30. The ink droplets not contributing to the actual printing operation are not charged nor deflected, and are directed to a beam gutter 34. The ink liquid collected by the beam gutter 34 is returned to the ink cartridge 10 via a returning conduit 36. The ink liquid introduced into the returning conduit 36 is fed to the ink discharge needle 18 by means of a suction pump 38. Valves 40 and

42 are associated with the suction pump 38 to ensure the ink liquid returning operation.

The ink cartridge 10 of the present invention is provided with a cylinder shaped projecting opening 44 formed in the upper surface thereof. The outer periphery of the projecting opening 44 is provided with a thread portion to which a cap 46 is engaged. The cap 46 is demounted from the projecting opening 44 when new ink liquid is introduced into the ink cartridge 10. As seen in FIG. 4 the cap 46 includes handling ribs 48, and flat plate portions 50 which ensure tight connection between the cap 46 and the upper surface of the ink cartridge 10. When the ink jet system printer is placed in an operating condition, the cap 46 is slightly loosened so as to maintain the ink liquid 14 contained in the ink cartridge 10 at atmospheric pressure. In FIG. 2, the communication/seal portions 52 and 54 are formed on the bottom wall of the ink cartridge 10 through which the ink intake needle 12 and the ink discharge needle 18 are inserted, respectively. The communication/seal portions 52 and 54 have the same construction.

The communication/seal portion 52 (54) includes a cylinder shaped projection 56 which has an ink liquid passage 58 formed through the center of the cylinder shaped projection 56. A thread portion 60 is formed on the outer periphery of cylinder shaped projection 56. A seal cap 62 has a thread portion formed on the inner cylindrical surface thereof, the thread portion being engaged with the thread portion 60 of the cylinder shaped projection 56. The seal cap 62 is provided with a communication opening 64 which is formed at the center of the bottom wall of the seal cap 62. A rubber seal 66 for sealing the ink liquid passage 58 formed in the cylinder shaped projection 56, and an ink liquid absorbing pad 68 made of sponge are disposed between the cylinder shaped projection 56 and the seal cap 62.

When the thus constructed ink cartridge 10 is secured to the ink liquid supply system, the ink intake needle 12 is inserted through the ink liquid absorbing pad 68 and the seal rubber 66 via the communication opening 64. The tip end of the ink intake needle 12 reaches the ink liquid 14 disposed in the ink cartridge 10 so as to introduce the ink liquid 14 from the ink cartridge 10 into the ink liquid supply system. In a same manner, the ink discharge needle 18 is inserted through the ink liquid absorbing pad 68 and the rubber seal 66 so that the ink liquid developed from the suction pump 38 is returned to the ink cartridge 10.

When desired, the ink cartridge 10 is demounted from the ink liquid supply system. At this moment, the respective intake needle 12 and discharge needle 18 are removed from the rubber seal 66 and the ink liquid absorbing pad 68. If the ink liquid 14 remains in the ink cartridge 10, the ink liquid may flow or leak through a hole formed by the ink intake needle 12 (ink discharge needle 18) in the rubber seal 66. However, the thus leaked ink liquid is absorbed by the ink liquid absorbing pad 68, thereby preventing the ink liquid from dripping onto the ink jet system printer. Furthermore, the ink liquid absorbing pad 68 functions to wipe off ink liquid attached to the ink intake needle 12 and the ink discharge needle 18 when the ink cartridge 10 is demounted from the ink liquid supply system.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink cartridge for an ink liquid supply system which includes an ink intake needle for introducing ink from said cartridge into said supply system and an ink discharge needle for returning ink liquid to said ink cartridge, said ink cartridge comprising a bottom surface provided with two cylinder shaped projections each having an ink liquid passage formed therein through each center of said respective cylinder shaped projection for accommodating said respective intake and discharge needles and communicating with ink liquid disposed in said ink cartridge, means for sealing each of said ink liquid passages and means for absorbing ink, disposed repsectively in the prescribed order, on said projections and cap means for capping each of said cylinder shaped projections, said sealing means and ink absorbing means being disposed between said cylinder shaped projections and said cap means, each of said cap means being provided with an opening corresponding with said ink liquid passages of said cylinder shaped projections for introduction of said intake and discharge needles accordingly.

2. The ink cartridge of claim 1, wherein said cartridge further includes an upper surface having a cylindrically shaped opening projecting therefrom for introduction of ink into said ink cartridge and a corresponding cap therefor.

3. The ink cartridge of claim 1, wherein each of said cylinder shaped projections includes a thread portion formed on an outer periphery thereof, and each of said cap members includes a thread portion formed on an inner surface thereof so that said cap member is secured to said corresponding cylinder shaped projection by engaging said respective thread portions to each other.

* * * * *